(12) United States Patent
Kelsay

(10) Patent No.: US 6,962,448 B2
(45) Date of Patent: *Nov. 8, 2005

(54) OPTICAL INTERLINK BETWEEN AN OPTICAL TRANSDUCER AND OPTICAL DATA PORT

(75) Inventor: Curtis Gregory Kelsay, Boise, ID (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/491,994

(22) Filed: Jan. 26, 2000

(65) Prior Publication Data

US 2002/0076247 A1 Jun. 20, 2002

(51) Int. Cl.⁷ .............................................. H04B 10/00
(52) U.S. Cl. .................... 400/62; 400/693; 359/152; 359/154; 359/159; 359/173; 385/33; 385/74
(58) Field of Search ........................ 400/61, 691, 692, 400/693, 703, 62; 359/172, 173, 152, 154, 359/159; 385/33, 38, 61, 74, 79; 347/108

(56) References Cited

U.S. PATENT DOCUMENTS

| | | | | |
|---|---|---|---|---|
| 4,834,485 A | * | 5/1989 | Lee | 350/96.19 |
| 5,218,466 A | * | 6/1993 | Brooks | 359/152 |
| 5,570,220 A | * | 10/1996 | Matsumoto et al. | 348/343 |
| 5,682,379 A | * | 10/1997 | Mahany et al. | 370/311 |
| 5,736,782 A | * | 4/1998 | Schairer | 257/679 |
| 5,796,890 A | * | 8/1998 | Tsuji et al. | 385/24 |
| 5,848,203 A | * | 12/1998 | Kawakami et al. | 385/11 |
| 5,857,065 A | * | 1/1999 | Suzuki | 358/1.15 |
| 5,963,349 A | * | 10/1999 | Norte | 359/113 |
| 6,005,700 A | * | 12/1999 | Pressler et al. | 235/492 |
| 6,034,818 A | * | 3/2000 | Sedlmayr | 359/497 |
| 6,064,502 A | * | 5/2000 | Burns et al. | 359/152 |
| 6,125,228 A | * | 9/2000 | Gong | 385/146 |
| 6,128,117 A | * | 10/2000 | Kim | 359/152 |
| 6,188,495 B1 | * | 2/2001 | Inoue et al. | 359/152 |
| 6,264,376 B1 | * | 7/2001 | Savage, Jr. | 385/33 |
| 6,356,680 B1 | * | 3/2002 | Kirk et al. | 385/123 |
| 6,381,045 B1 | * | 4/2002 | DiGiovanni et al. | 359/114 |
| 6,477,293 B1 | * | 11/2002 | Golub | 385/24 |
| 6,486,994 B1 | * | 11/2002 | Giles | 359/163 |
| 2002/0102060 A1 | * | 8/2002 | Jewell et al. | 385/49 |

* cited by examiner

Primary Examiner—Andrew H. Hirshfeld
Assistant Examiner—Kevin D. Williams

(57) ABSTRACT

An optical interlink made from an optical transducer capable of optically exchanging information. Information to and from the optical transducer passes through a light pipe transducer end and an optical data port end. The optical light pipe consists of separate transmit and receive light pipes. To reduce losses as a result of the light pipe transmission, thereare lenses formed to collimate light between the transducer end of the light pipe and the optical transducer. The collimating lenses are formed in the light pipe. There are also provided additional lenses on the optical data port side of the light port. Transmitted light from the light pipe passes through a lens that increases the illumination angle of the light exiting from the optical data port. Received light passes through a lens that amplifies and collimates the light into the receiving light pipe.

11 Claims, 3 Drawing Sheets

OPTICAL INTERLINK BETWEEN AN OPTICAL TRANSDUCER AND OPTICAL DATA PORT

BACKGROUND OF THE INVENTION

The advent of portable electronic devices, especially portable personal computers, such as laptops, notebooks and the like, has spurred a desire to transfer data from one device to another without having to physically connect the two devices. One example of this is printing a document to a printer from a notebook type computer. In the past, this could only be accomplished by attaching a cable between a serial or parallel port on the computer and a serial or parallel port on the printer. To eliminate this problem, manufacturers have turned to infra-red (IR) data transfer wherein each device is provided with an infra-red data port, which often include both an infra-red source and an infra-red detector or receiver.

One of the drawbacks to the current state of the art is that the "field of view" of the infra-red transducers is limited to approximately 30°, i.e. 15° on both sides of the axis. This places limitations on where the user can position the devices since the data ports must more or less line up. For instance, if the notebook computer's IR port is located on the back panel of the computer and the printer's IR port is located on the front panel of the printer, the computer must be placed generally in front of the printer to complete the data transfer. This can be a problem if there isn't enough available space on the table or desktop in front of the printer.

An additional problem, which is present in some electronic device designs, is a consequence of the limited available space within the electronic device itself. For instance, in most laser printers the majority of the space of the printer is utilized by the print engine and paper transport mechanism leaving little room for supporting electronics. The printed circuit assembly (PCA) is often mounted towards the rear of the printer to allow for the rear panel wire connection. With this location of the PCA, the IR transducer must be remotely located to provide front panel access.

In an effort to reduce the amount of desk space a peripheral such as a printer uses, the placement of the PCA within the peripheral may not allow the IR transducer proper external access. Prior to the present invention, the solution was to physically locate the IR transducer where it would have the necessary external access while providing the electrical connection to and from the PCA via a wire harness. Such approach increases the cost and potentially creates RFI problems.

SUMMARY OF THE INVENTION

In order to accomplish the present invention there is provided an optical interlink which is made from an optical transducer capable of optically exchanging information. Information to and from the optical transducer passes through a light pipe transducer end and an optical data port end. The optical light pipe consists of separate transmit and receive light pipes. To reduce losses as a result of the light pipe transmission, there are lenses formed to collimate light between the transducer end of the light pipe and the optical transducer. The collimating lenses are formed in the light pipe. There are also provided additional lenses on the optical data port side of the light port. Transmitted light from the light pipe passes through a lens that increases the illumination angle of the light exiting from the optical data port. Received light passes through a lens that amplifies and collimates the light into the receiving light pipe.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
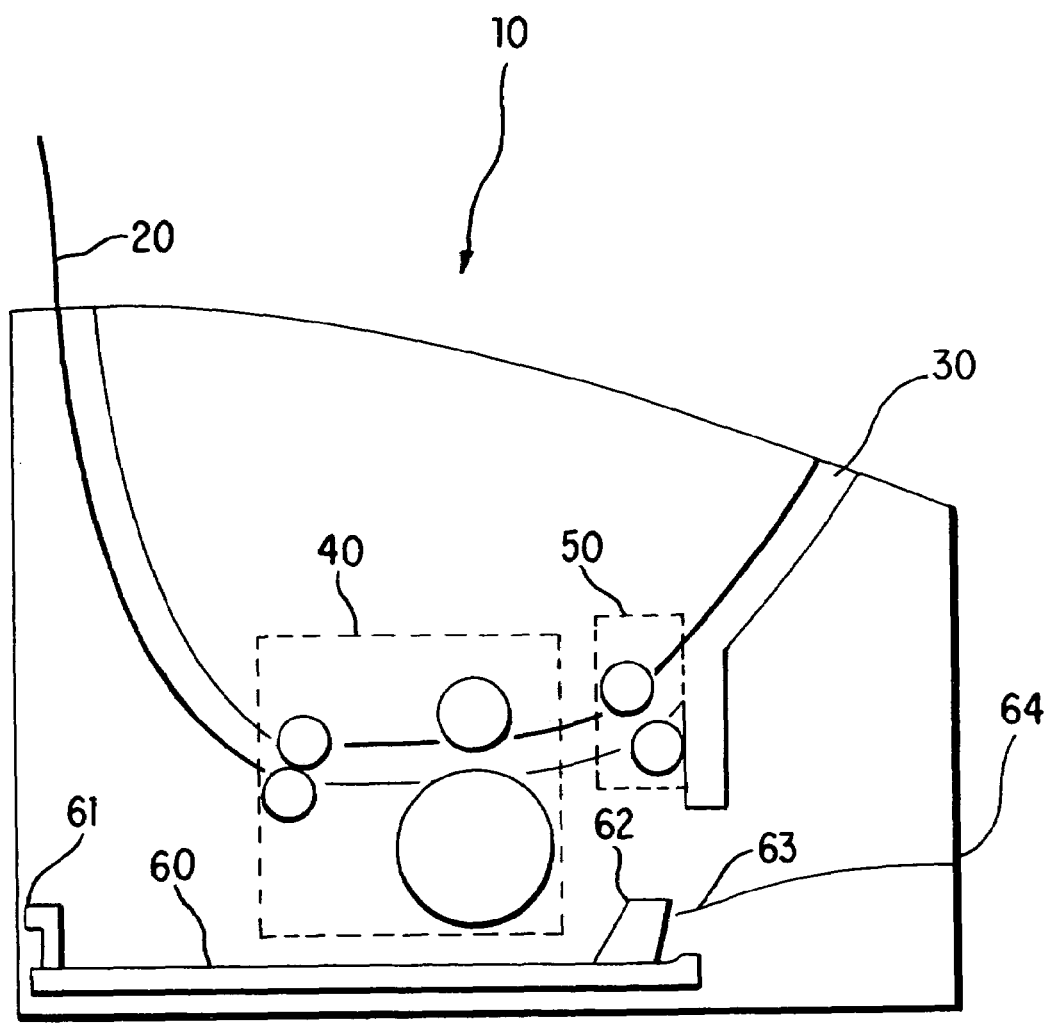
FIG. 1 is a simplified internal view of a printer incorporating the present invention.

The present invention is not limited to a specific embodiment illustrated herein, in particular, while the preferred embodiment is shown as a printer, the present invention may be utilized by other equipment such as computers, facsimile machines, cameras, scanners, handheld devices, remote control devices, or data gathering devices. Referring particularly to FIG. 1 there is shown a printer 10 incorporating the present invention. Printer 10 includes many subsystems not shown but known by one skilled in the art. Shown within printer 10 is print engine 40, which is shown as a electro-photographic process (EP) mechanism. Other types of printing process could also be used. Paper enters the printer from paper supply 20 and passes through print engine 40 where the desired image is placed on the paper. The paper then passes through fusing station 50 where the image is fused to the paper. Finally the paper exits printer 10 through opening 30.

PCA 60 includes numerous electronics which control the printing process. Typically the electronics include things such as a microprocessor, memory, firmware, and I/O ports. Under the direction of the firmware or software, the microprocessor controls the printing process and communicates with external devices. As shown in FIG. 1 PCA supports two I/O ports. A direct wire port (61) is shown near the rear of the printer. This port is used to connect printer 10 to other devices such as a computer. Such a direct wired port is known in the art and may support one or more common configuration such as centronics, bitronics, 1284, USB, or network. A second optical data port (64) is shown at the front of printer 10. This optical data port provides bidirectional wireless communication between the printer and other devices. The preferred embodiment use Infra-red light for the optical data port, but other types may be used with the present invention. The IR data port may use one or more protocol such as the Infra-Red Data Association (IRDA) protocol. The IR data port (64) is connected to IR transducer 62 by a pair of light pipes 63.

Figure 2:
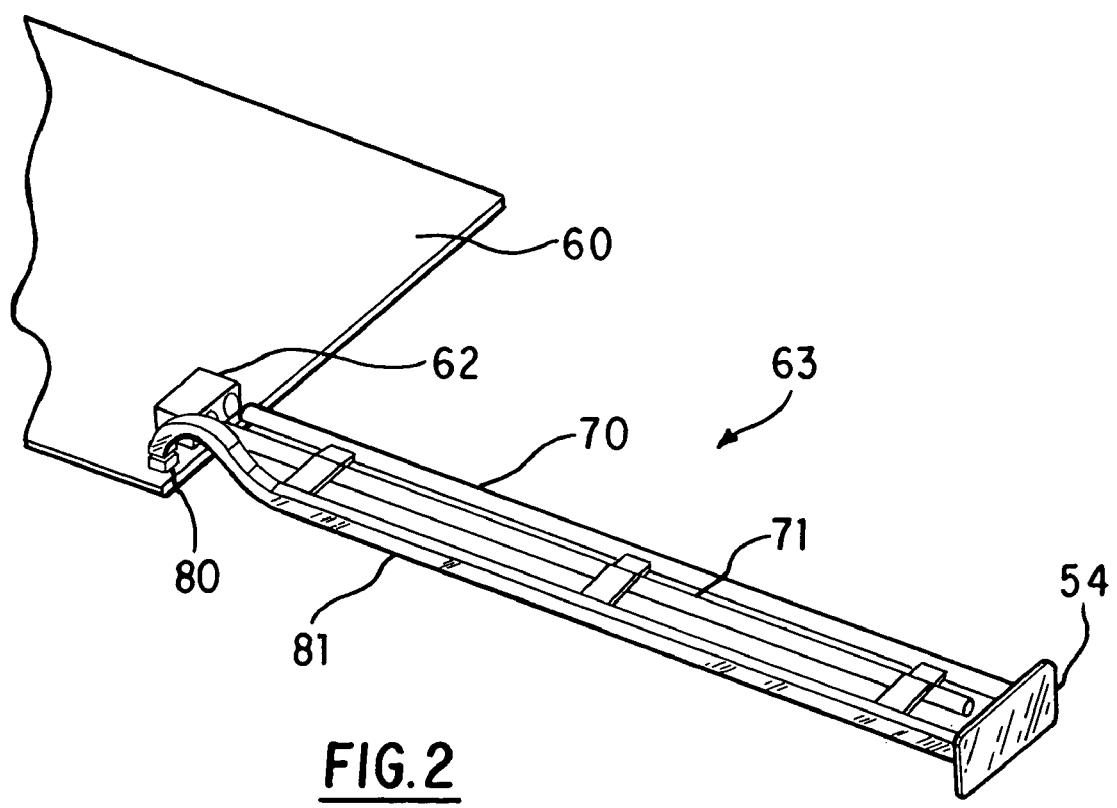
FIG. 2 shows the light pipe assembly in greater detail.

Referring next to FIG. 2 the light pipe assembly 63 is shown in greater detail. Light pipe 63 is constructed from two light pipes, one for transmit (70) and a second (71) for receive. Window 54 provides the optical interface to external devices. The transmit light pipe optically connects the transmit portion of the IR transducer 62 to the window 54. In a similar manner, receive light pipe 71 optically connects window 54 to the receive portion of IR transducer 62. The light pipe can be made from several materials know in the art. In the preferred embodiment, the light pipe and lenses were formed from natural polycarbonate also known as GE Lexan 111N.

FIG. 2 also shows a light guide 81. As is typical, printer 10 conveys information to the user by way of a "READY" LED (80), while it is possible to mount LED 80 remotely from PCA 60, the use of a light guide or light pipe will allow the LED 80 to be mounted on the PCA. The light guide 81 transmits the LED light external of the printer. It should be understood that the light guide 81 is not necessary for proper operation of the IR I/O.

Figure 3:
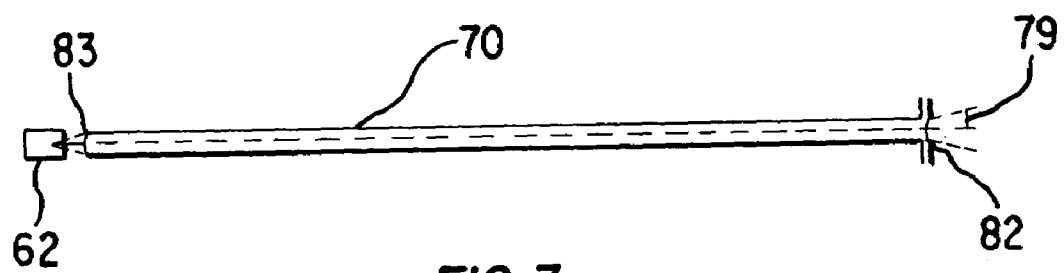
FIG. 3 shows the transmitting portion of the light assembly and its associated lenses.

Referring next to FIG. 3 where the transmit light pipe 70 is shown in greater detail. The transmit light pipe 70 is a constant cross section molded part with integral lens details on each end. Lens 83 collimates the light rays from the IR transducer for more efficient coupling and transmission through the light pipe. Lens 82 at the window increases the angle of illumination 79 of light exiting the window thereby creating an acceptable "viewing" angle distribution of the light rays as they exit the printer.

Figure 4:
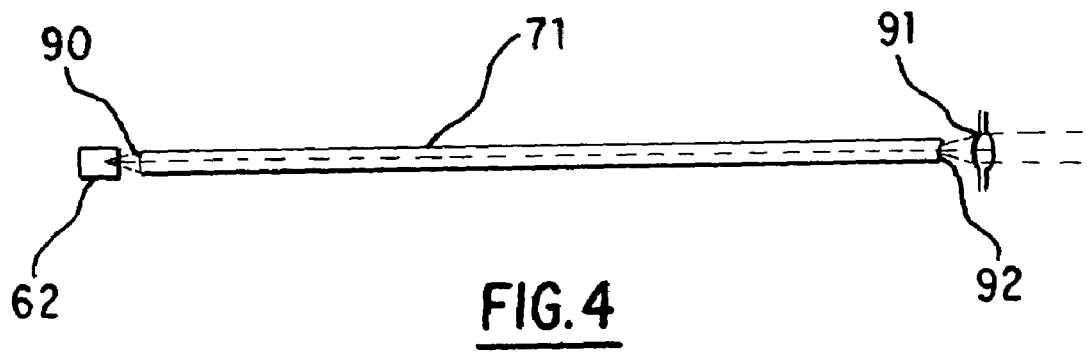
FIG. 4 shows the receiving portion of the light assembly and its associated lenses.

The receiving light pipe 71 is shown in FIG. 4. Receiving light pipe is also a constant cross section molded part with integral lens details on each end. Lens 90 is formed in the light pipe to collimate the light on to the receiving portion of the IR transducer. At the other end, receiving light pipe uses a lens to collect and thereby amplify the received light to help recover losses from transmission through the light pipe. FIG. 4 shows two lenses 91 and 92. Lens 92 is integral to the receive light pipe and can be formed as part of the molding process of the light pipe. Optional lens 91 could be formed during the molding of the plastic window 54. Optional lens 91 provides additional amplification and may provide improved performance of the IR data port.

One skilled in the art will understand that when designing the light pipes and lenses, several losses must be taken in to consideration. Some of these losses include Fresnel losses, surface scatter, and absorption losses. Fresnel losses are due to reflection at the entry and exit points. Surface losses are due to imperfect surface finishes and reflection of light off of these surfaces. Absorption losses are due to material properties of light pipe material for IR frequency light. Additionally, the light pipe should be designed to couple to the specific optical transducer. Ideally, the optical data port end of the transmit light pipe should have a similar "viewing" angle as the transducer. It may be desirable for the optical transducer to have a small viewing angle thereby increasing the amount of light coupled into the light pipe, while the optical data port lens creates a desired viewing angle to the external devices.

Although the preferred embodiment of the invention has been illustrated, and that form described, it is readily apparent to those skilled in the art that various modifications may be made therein without departing from the spirit of the invention or from the scope of the appended claims.

What is claimed is:

1. A printer, comprising:
   a housing;
   a print engine disposed within the housing;
   a printed circuit assembly disposed within the housing;
   a direct wire port electrically coupled to the printed circuit assembly;
   an optical transducer electrically coupled to the printed circuit assembly and configured to transmit and receive information optically;
   an optical data port formed in the housing; and
   a light pipe assembly optically coupling and providing bi-directional communication between the optical transducer and the optical data port.

2. The printer of claim 1, wherein the light pipe assembly includes a transmit light pipe adapted to optically transmit information from the optical transducer to the optical data port, and a receive light pipe adapted to optically receive information via the optical data port and optically transmit the received information to the optical transducer.

3. The printer of claim 2, wherein the optical data port is arranged to communicate with an open environment, and wherein the transmit light pipe is configured to exit and diverge light from the optical data port to the open environment, and the receive light pipe is configured to converge light from the open environment on the optical transducer.

4. The printer of claim 3, wherein the light pipe assembly further includes a transmit lens configured to increase an angle of illumination of light exiting the optical data port to the open environment, and a receive lens configured to collimate light from the open environment into the receive light pipe.

5. The printer of claim 1,
   wherein the housing has a first side and a second side,
   wherein the printed circuit assembly, the optical transducer, and the light pipe assembly are disposed within the housing, and
   wherein the direct wire port communicates with the first side of the housing and the optical data port communicates with the second side of the housing.

6. The printer of claim 5, wherein the second side of the housing is opposite the first side of the housing.

7. The printer of claim 1, further comprising:
   a light source electrically coupled to the printed circuit assembly; and
   a light guide optically coupling the light source and the optical data port.

8. A printer, comprising:
   a printer housing;
   a print engine disposed within the printer housing;
   a printed circuit assembly disposed within the printer housing;
   a direct wire port electrically coupled to the printed circuit assembly;
   an optical transducer electrically coupled to the printed circuit assembly and configured to transmit and receive information optically;
   an optical data port formed in the printer housing and arranged to communicate with an open environment;
   a transmit light pipe disposed within the printer housing and adapted to optically transmit information from the optical transducer to the optical data port; and
   a receive light pipe disposed within the printer housing and adapted to optically receive information via the optical data port and optically transmit the received information to the optical transducer.

9. The printer of claim 8, wherein the transmit light pipe is configured to exit and diverge light from the optical data port to the open environment, and the receive light pipe is configured to converge light from the open environment on the optical transducer.

10. The printer of claim 8, further comprising:
    a transmit lens provided at an end of the transmit light pipe, wherein the transmit lens is configured to increase an angle of illumination of light exiting the optical data port to the open environment; and
    a receive lens provided at an end of the receive light pipe, wherein the receive lens is configured to collimate light from the open environment into the receive light pipe.

11. The printer of claim 8, further comprising:
    a light source electrically coupled to the printed circuit assembly; and
    a light guide disposed within the printer housing and extended between the light source and the optical data port, wherein the light guide is adapted to transmit light from the light source to the open environment.

* * * * *